Dec. 16, 1941.    H. W. UHLRIG    2,266,100
ATTACHMENT FOR ELECTRIC APPLIANCES
Filed Jan. 5, 1940
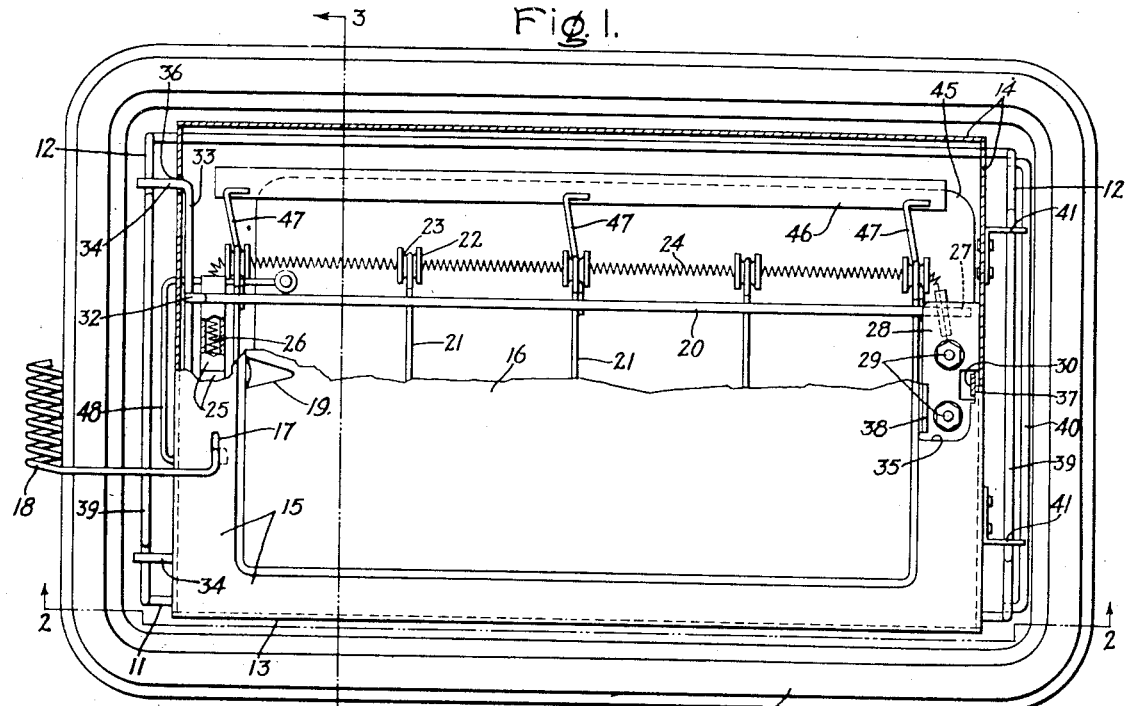
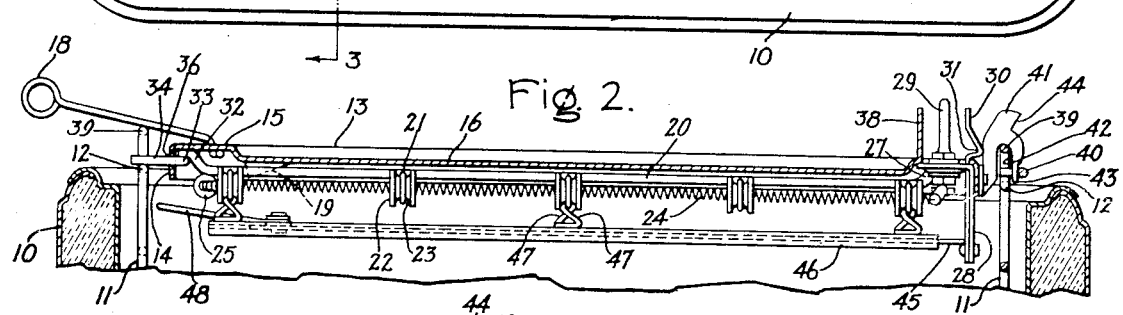
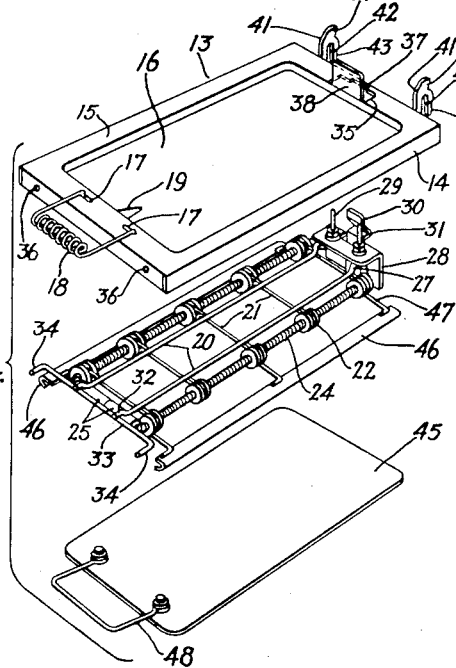
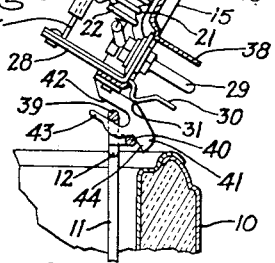
Inventor:
Harry W. Uhlrig,
by Harry E. Dunham
His Attorney.

Patented Dec. 16, 1941

2,266,100

UNITED STATES PATENT OFFICE 2,266,100

ATTACHMENT FOR ELECTRIC APPLIANCES

Harry W. Uhlrig, Stratford, Conn., assignor to General Electric Company, a corporation of New York Application January 5, 1940, Serial No. 312,528

8 Claims. (Cl. 219—35)

My invention relates to an attachment for an electric appliance and more particularly a broiler-griddle attachment for an electric roaster and has for its primary object the provision of a new and improved broiler-griddle attachment which is simple in construction, can be manufactured at low cost, and operates with a maximum effectiveness during either broiling or griddle operations.

It is a further object of my invention to provide a new and improved broiler griddle attachment which may be removably hinged on the rack provided in an electric roaster.

It is a specific object of my invention to provide a new and improved broiler-griddle attachment having a detachable heating unit and removable means for transmitting the heat from said heating unit to the griddle or frying surface of the attachment.

It is a further specific object of my invention to provide a broiler-griddle attachment having a removable reflector which is suspended from the heating unit when the attachment is being used as a griddle and may be removed from the heating unit when the attachment is to be used for broiling purposes.

It is a further specific object of my invention to provide simple and inexpensive means for removably supporting a reflector beneath the heating unit of a broiler-griddle attachment for an electric roaster.

It is a still further object of my invention to provide in an attachment for an electric roaster a griddle surface having means for draining the grease collected thereon during use of the surface for cooking operations and a reflector mounted below the griddle surface, the means for supporting the reflector being constructed and arranged so that draining of the grease from the griddle surface is unobstructed by the reflector.

It is a further object of my invention to provide a broiler-griddle attachment which is simple and safe to operate, means being provided to minimize the possibility of accidentally short-circuiting or removing the heating unit assembly during use of the attachment.

Further objects and advantages of my invention will become apparent as the following description proceeds and the features of novelty which characterize my invention will be set forth in the claims appended to and forming a part of this specification.

For a more complete understanding of my invention, reference should be had to the accompanying drawing in which Fig. 1 is a plan view, partially broken away, showing my improved broiler-griddle attachment mounted on an electric roaster; Fig. 2 is a front elevation, partly in section, taken on the line 2—2 of Fig. 1, details of the roaster being shown fragmentarily; Fig. 3 is a sectional view taken on the line 3—3 of Fig. 1 with the handle removed; Fig. 4 is an exploded view showing details of the component elements of my improved broiler-griddle attachment; and Fig. 5 is a partial view in elevation showing the position of the hinge elements when the broiler is in the elevated or raised position.

Referring to the drawing, 10 represents an electric roaster and in particular the casing of such a roaster and 11 represents the rack provided within the well of the electric roaster for supporting the edible to be prepared. The roaster 10 may have any desired construction but a rectangular-shaped roaster is preferred. The rack used with the roaster may also be of any desired construction but it is preferred to use a rack fabricated from a length or lengths of wire so as to have handle portions 12 extending above the top edge of the roaster.

Mounted on the rack 11 is a broiler-griddle attachment which comprises a tray-like member 13 having downwardly extending flange portions 14 and rim portions 15 surrounding a depressed central portion 16 which may be used as a griddle or frying surface. In the preferred form of my invention, the member 13 is pressed from a single sheet of metal such as aluminum or some similar good heat conducting material. Provided in the rim portion 15 at one end of the tray 13 is a pair of slots 17 in which is secured a suitable handle 18 which may be used to elevate the attachment. Arranged centrally of the cooking surface 16 adjacent the handle end thereof is a pressed out opening 19 through which grease which has accumulated on the cooking surface 16 during use thereof may be drained into a suitable drip pan (not shown) located in the roaster well.

Detachably secured to the member 13 is a heating unit assembly which comprises a pair of longitudinally extending bars 20 to which is secured a plurality of cross bars 21 upon the ends of which are mounted insulators 22. Each of the insulators 22 is provided with a central groove portion 23 and the ends of the cross bars 21 are wrapped around this groove portion in order to secure the insulators firmly in position. Each insulator is also provided with a central opening through which is threaded a coiled resistance element 24. Threaded on the resistance element 24 is a pair of elongated insulators 25 which cover the end portion 26 of the element 24 to insulate the element 24 electrically from the longitudinal bars 20 and the adjacent cross bars 21 and to insulate thermally the portion of the marginal rim 15 which overlies the end 26 when the heating unit is attached to the member 13. Provided on one end of the longitudinally extending bars 20 is an offset portion 27 to which is soldered, welded or otherwise secured an L- shaped plate 28 on which is mounted a pair of vertically extending terminal jacks 29 and a vertically extending spring clip 30 having a detent portion 31. Provided on the opposite end of the longitudinally extending bars 20 is a second offset portion 32 to which is soldered, welded or otherwise secured a channel shaped cross bar 33 having outwardly extending portions 34 integrally formed at each end thereof.

In order to effect the detachable securing of the heating unit assembly to the tray-like member 13, an opening 35 through which the terminal jacks 29 are adapted to extend is provided in the rim portion 15 at the end opposite the handle end of the attachment. Provided in the flange portion 14 on the handle end of the attachment is a pair of spaced openings 36 which are adapted to receive the outwardly extending portions 34 of the cross arm 33. In attaching the heating unit to the tray 13, the ends 34 of the cross arm 33 are inserted in the openings 36 and the heating unit is then pushed upwardly until the detent 31 of the spring clip 30 snaps over the top edge of the rim portion 15. A recess 37 is cut in the rim portion 15 adjacent the opening 35 and the spring clip 30 is adapted to fit in this recess in order to prevent lateral twisting of the heating unit assembly with reference to the tray. In order to remove the heating unit, one has only to press inwardly on the spring clip until the detent clears the top edge of the adjacent flange 14 to allow the heating unit to drop downwardly and be moved to the right so that the ends of the bar 33 may be removed from the openings 36.

As will be observed, when the heating unit is attached to the member 13, the terminal jacks 29 extend above the surface of the rim portion 15 so that they can be engaged by the plug of a suitable cord set (not shown) for connecting the unit to a source of electrical supply. In many instances the plug, when applied to the terminal jacks, does not completely cover them so that there is some danger that the terminal jacks might be accidentally short-circuited by a knife or similar utensil being used during the cooking operation. In order to prevent short-circuiting of the jacks in such a manner, a barrier or shield 38 is pressed out of the rim portion 15 adjacent the opening 35. This barrier extends vertically upward along one side of the terminal jacks and acts as a guard therefor. The spring clip 30 extends vertically upward along the opposite side of the terminal jacks and functions as a guard for this side.

It is to be observed that the upper end of the clip 30 extends inwardly toward the terminal jacks 29. This end is adapted to be engaged by the outer wall of the plug of the cord set, when the plug is mounted on the terminal jacks, and is pressed outwardly thereby. In this way the detent 31 is positively held in its latching position thus insuring that the heating unit will not be detached while it is energized.

As previously pointed out, the entire broiler-griddle attachment is in its preferred form adapted to be supported on the rack 11 located in the roaster well. In accordance with my invention the attachment is removably hinged on the roaster rack in order to facilitate raising of the attachment for loading or inspection purposes during use of the attachment for broiling purposes. In order to effect such a mounting, each of the handles 12 of the rack is provided with a raised portion 39 and provided on one of the handles adjacent its raised portion is a cross bar 40. As shown in the drawing, the broiler-griddle attachment is hingedly supported at one end by means of a pair of hinge brackets 41 which are adapted to engage the raised portion 39 of the handle to which the cross bar 40 is secured. The hinge brackets 41 are spaced from each other and each is provided with a slot 42 which is adapted to receive the raised portion of the handle. The slots 42 are cut sufficiently deep so that the outside edges 43 of the hinge brackets extend downwardly inside of the cross bar 40. In addition, each of the hinge brackets is provided with a tongue 44 which is adapted to engage the cross bar 40 so as to act as a stop to prevent the broiler from falling clear when it is in the raised position shown in Fig. 5. In addition to acting as stops, the tongues 44 engage the cross bar 40 and prevent side motion of the attachment when it is in the raised position shown in Fig. 5. In order to support the handle end of the attachment, the portions 34 of the arm 33 are made sufficiently long so that they will extend through the opening 36 a sufficient distance to engage the handle portion 12 of the rack. As shown in Figs. 1 and 2, the ends 34 are spaced from each other an amount sufficient to permit the raised portion 39 of the adjacent handle 12 to lie therebetween. By means of this construction and arrangement the raised portion 39 acts as a stop to limit side motion of the attachment when it is in the position shown in Figs. 1 and 2.

One of the important features of my invention is to provide a broiler-griddle attachment, such as that described above, with improved means for making the attachment equally effective as a broiler and as a griddle. Toward this end, I have provided a reflector 45 which is removably and slidably supported on the heating unit assembly. The reflector plate 45 is made of some suitable metallic material, such as aluminum, and is provided with highly reflective surfaces on both sides. The means by which the reflector is removably and slidably supported in position comprises V-shaped trackways 46 arranged on each side of the heating unit assembly. These trackways 46 are suspended from the longitudinally extending bars 20 of the heating unit assembly by means of a plurality of arms 47 which extend downwardly and outwardly from the bars 20. The trackways 46 are spaced apart throughout their length so that the reflector plate 45 may be slidably positioned therebetween. A handle 48 is provided on one end of the reflector plate 45 to facilitate positioning it in the trackways.

When the attachment is to be employed as a griddle, the reflector plate 45 will be slid along the trackways 46 until the end of the plate abuts against the lower end of the clip 30 which is fastened to the L-shaped plate 28. The reflector is of such a length that its opposite end will lie just to the right of the drip recess 19 so that the draining of the grease collected on the surface 16 during use will not be obstructed by the reflector. With the reflector thus positioned below the heating unit, all of the heat emanating from the unit will be available for heating the frying surface 16 of the member 13, some of the heat being transmitted to the surface by direct radiation and the remainder of the heat being transmitted to the surface by reflection from the plate 45. In this way all of the heat available is effectively employed and the frying surface will attain a temperature suitable for frying or otherwise cooking without supplying any additional energy to the heating unit 24.

When the attachment is to be used for broiling operations, the plate 45 will be slidably removed from under the heating unit 24 and the heat emanating from the heating unit will be directed downwardly onto the surface of the food to be broiled. Some of this heat will be radiated directly downwardly from the heating unit but in order to utilize fully the heat emitted by the unit, the under side of the surface 16 is polished so as to reflect the heat transmitted thereto downwardly onto the surface of the material being broiled.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a broiler-griddle attachment for an electric roaster having a cooking well and a rack within said well, a frame having a cooking surface, means for mounting said frame on said rack, a heating unit detachably mounted in said frame, a trackway, a plurality of arms for supporting said trackway on and below said heating unit, and a reflector plate slidably supported on said trackway so that when said cooking surface is used for cooking purposes said reflector may be mounted in position to reflect heat to the under side of said surface and when said surface is not used for cooking purposes as during use of the attachment as a broiling unit for broiling edibles placed under it said reflector may be removed leaving the heat path to said edible being broiled substantially unobstructed.

2. In an attachment for an electric roaster having a cooking well and a rack within said well, a frame having a cooking surface integrally formed therewith, means for removably hinging said frame on said rack, a heating unit assembly, means for removably latching said assembly on said frame near the under side of said cooking surface, a reflector, and means including a plurality of arms mounted on said heating unit assembly for slidably mounting said reflector below said heating unit assembly.

3. In an attachment for an electric roaster having a cooking well and a rack within said well, a cooking surface, hinge brackets on said surface for hingedly mounting said surface on said rack, a heating unit assembly, means for removably mounting said heating unit assembly on said cooking surface, a reflector plate, a plurality of arms extending downwardly and outwardly from said heating unit, and means supported by said arms for slidably supporting said reflector plate below said heating unit.

4. In an attachment for an electric roaster having a cooking well and a rack within said well, a cooking surface, means for removably hinging one end of said cooking surface on said rack, a heating unit assembly having a pair of longitudinally extending bars, means including said bars for detachably securing said heating unit assembly to said cooking surface, said bars engaging said rack to support the opposite end of said cooking surface, a reflector plate, a plurality of arms secured to said bars and extending downwardly and outwardly therefrom, and a V-shaped trackway lying on each side of said heating unit and secured to said arms so that said reflector plate may be detachably and slidably secured to said heating unit.

5. In an attachment for an electric roaster having a cooking well and a rack located in said cooking well, a frame with a cooking surface therein, said cooking surface having an opening adjacent one end thereof through which grease collecting on said surface may be drained, means on said frame for hingedly and removably supporting said attachment on said rack, a heating unit assembly removably mounted on said frame, a reflector plate, and means for supporting said reflector plate below said heating unit so that the draining of the grease from said cooking surface will be unobstructed.

6. In an attachment for an electric roaster having a cooking well and a rack located within said well, a frame having a cooking surface formed therein adapted to be hingedly and removably supported on said rack, said cooking surface having an opening through which grease collecting on said surface during cooking operations may drain, a heating unit assembly mounted adjacent the under side of said cooking surface, a reflector plate, means for removably and slidably supporting said reflector plate below said heating unit, said means being constructed and arranged so that said reflector plate when mounted thereon will lie out of the path of the grease draining through said opening whereby the draining of said grease is unobstructed.

7. In an attachment for an electric roaster, a tray-like member having a depressed central portion forming a cooking surface and having an opening adjacent one end thereof, a heating unit assembly including a pair of vertically extending terminal jacks, means for detachably securing said heating unit assembly to said member, said terminal jacks extending vertically through said opening so as to be engaged by a plug receptacle adapted to connect said heating unit to a power source, and a shield on said member adjacent said opening constructed and arranged to prevent accidental short-circuiting of said terminal jacks when the latter are connected to a power source by said plug receptacle.

8. In an attachment for an electric roaster, a tray-like member having a depressed central portion surrounded by a rim portion, walls defining an opening in said rim portion adjacent one end of said member, a heating unit assembly having a pair of vertically extending terminal jacks and a vertically extending clip spaced from said terminal jacks, means including said clip for detachably securing said heating unit assembly to said member, said terminal jacks extending through said opening so as to be engaged by a plug receptacle adapted to connect said heating unit to a power source, a shield integrally formed on said member adjacent said opening and adapted to prevent accidental contact from one side with said terminal jacks when the latter are energized, said resilient clip acting as a barrier to prevent accidental contact with said terminal jacks from the opposite side when said terminal jacks are energized.

HARRY W. UHLRIG.